(12) United States Patent
Rakib et al.

(10) Patent No.: US 10,098,092 B2
(45) Date of Patent: *Oct. 9, 2018

(54) MULTIPLE ACCESS IN WIRELESS TELECOMMUNICATIONS SYSTEM FOR HIGH-MOBILITY APPLICATIONS

(71) Applicant: Cohere Technologies, Inc., Santa Clara, CA (US)

(72) Inventors: Shlomo Rakib, Saratoga, CA (US); Ron Hadani, Austin, TX (US)

(73) Assignee: Cohere Technologies, Inc., Santa Clara, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/410,622

(22) Filed: Jan. 19, 2017

(65) Prior Publication Data

US 2017/0289961 A1    Oct. 5, 2017

Related U.S. Application Data

(60) Provisional application No. 62/316,243, filed on Mar. 31, 2016, provisional application No. 62/316,298, filed on Mar. 31, 2016.

(51) Int. Cl.
| | | |
|---|---|---|
| *H04W 4/00* | (2018.01) | |
| *H04W 72/04* | (2009.01) | |
| *H04L 5/00* | (2006.01) | |
| *H04L 27/04* | (2006.01) | |

(52) U.S. Cl.
CPC .......... *H04W 72/04* (2013.01); *H04L 5/0023* (2013.01); *H04L 27/04* (2013.01)

(58) Field of Classification Search
CPC ...... H04W 72/04; H04L 27/04; H04L 5/0023; H04L 11/003
USPC ........................................................ 370/329
See application file for complete search history.

(56) References Cited

U.S. PATENT DOCUMENTS

| | | | |
|---|---|---|---|
| 7,773,685 B2 | 8/2010 | Tirkkonon et al. | |
| 7,864,877 B2 | 1/2011 | Hottinen | |
| 8,619,892 B2 | 12/2013 | Vetter et al. | |
| 2006/0008021 A1 | 1/2006 | Bonnet | |
| 2007/0104283 A1 | 5/2007 | Han et al. | |
| 2013/0058390 A1 | 4/2013 | Haas et al. | |
| 2014/0169433 A1 | 6/2014 | Hadani et al. | |
| 2014/0348252 A1 | 11/2014 | Siohan et al. | |
| 2015/0080725 A1* | 3/2015 | Wegner | A61B 8/14 600/440 |
| 2015/0117395 A1 | 4/2015 | Hadani et al. | |

(Continued)

OTHER PUBLICATIONS

R. Hadani et al., "Orthogonal Time Frequency Space Modulation," 2017 IEEE Wireless Communications and Networking Conference (WCNC), San Francisco, CA, USA, 2017, pp. 1-6.

(Continued)

*Primary Examiner* — Sai Ming Chan
(74) *Attorney, Agent, or Firm* — Perkins Coie LLP

(57) ABSTRACT

A wireless telecommunications system that mitigates infra-symbol interference due to Doppler-shift and multipath and enables multiple access in one radio channel. Embodiments of the present invention are particularly advantageous for wireless telecommunications systems that operate in high-mobility environments, including high-speed trains and airplanes.

20 Claims, 16 Drawing Sheets

(56) References Cited

U.S. PATENT DOCUMENTS

2016/0157146 A1\* 6/2016 Karabinis ........... H04W 36/026
370/334

OTHER PUBLICATIONS

Mazzaro et al., "Introduction to Stepped-Frequency Radar," US Army RDECOM, Aug. 2013, pp. 1-22 (accessible at http://ece.citadel.edu/mazzaro/particip/SFR_Intro_Mazzaro.pdf, last accessed May 22, 2017).
Examiner's Amendment and Reasons for Allowance, U.S. Appl. No. 15/215,007, dated May 30, 2017, pp. 12-15, in particular.
Examiner's Amendment and Reasons for Allowance, U.S. Appl. No. 15/146,987, dated Jan. 25, 2017, pp. 2-3.
International Search Report and the Written Opinion of the International Searching Authority, International Application No. PCT/US2017/025291, International Filing Date Mar. 31, 2017.

\* cited by examiner

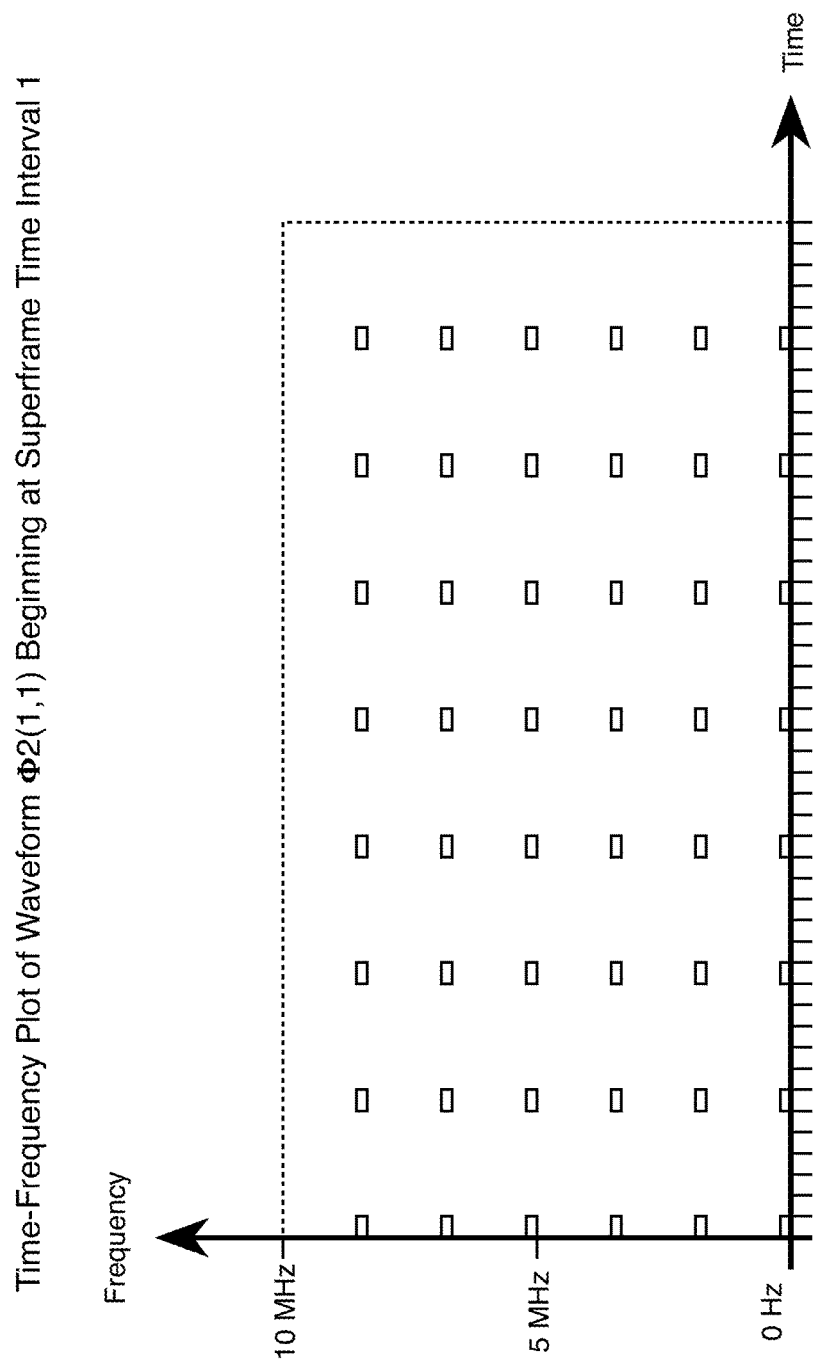

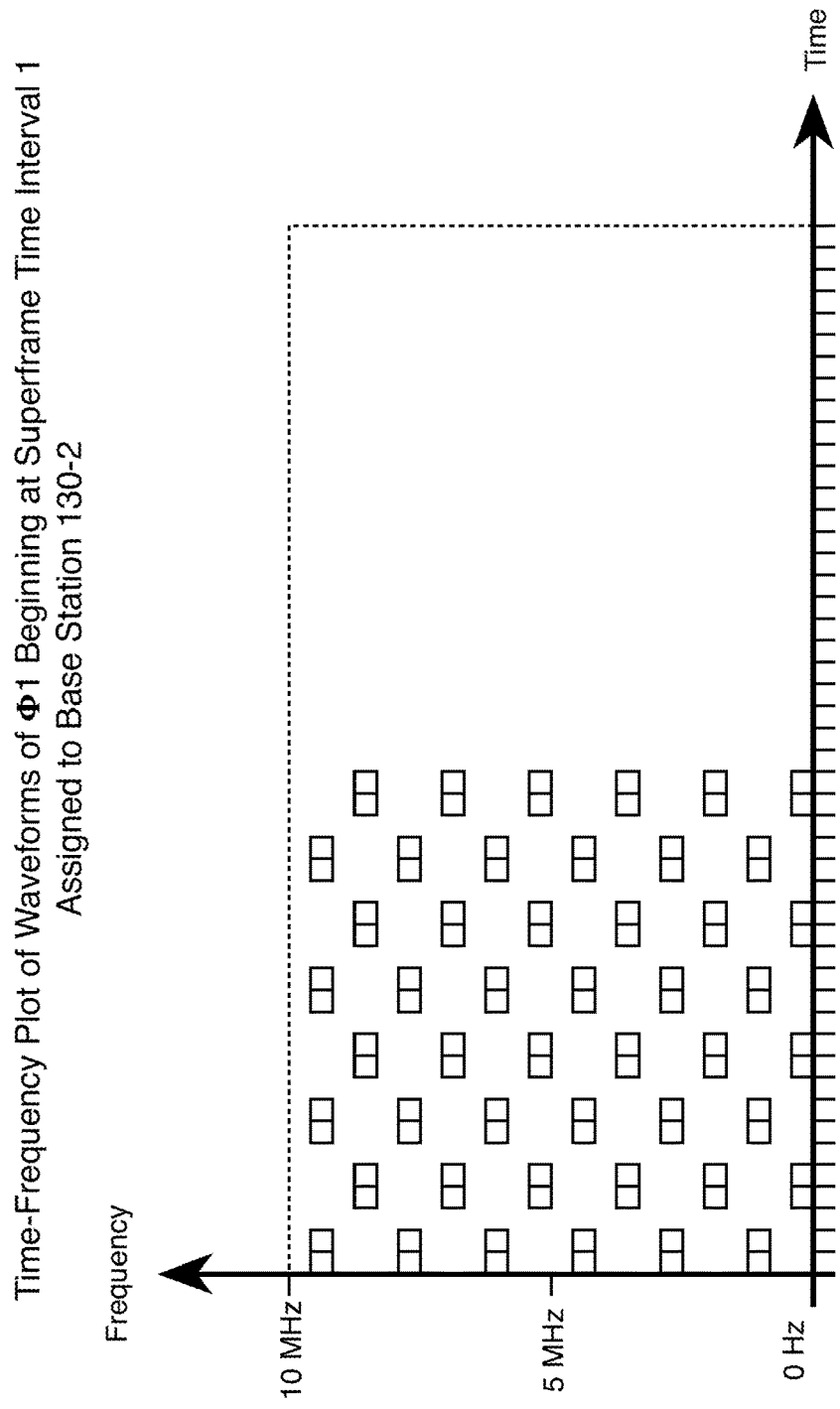

MULTIPLE ACCESS IN WIRELESS TELECOMMUNICATIONS SYSTEM FOR HIGH-MOBILITY APPLICATIONS

STATEMENT OF RELATED APPLICATIONS

This application claims benefit of:
U.S. provisional patent application No. 62/316,243, filed on 31 Mar. 2016, entitled "Robust Wireless Telecommunications System," and
U.S. provisional patent application No. 62/316,298, filed on 31 Mar. 2016, entitled "Orthogonal Time Frequency Space,"
both of which are incorporated by reference.

The following patent applications are incorporated by reference:
U.S patent application Ser. No. 15/146,987, filed on 5 May 2016, entitled "Wireless Telecommunications System for High-Mobility Applications," and
U.S patent application Ser. No. 15/215,007, filed on 20 Jul. 2016, entitled "Multiple Access in Wireless Telecommunications System for High-Mobility Applications," and U.S patent application Ser. No. 15/410,578, filed on 19 Jan. 2017, entitled "Wireless Telecommunications System For High-Mobility Applications,".

FIELD OF THE INVENTION

The present invention relates to wireless telecommunications in general, and, more particularly, to a wireless telecommunications system that can detect and mitigate impairments to its radio signals.

BACKGROUND OF THE INVENTION

A radio signal can be impaired as it propagates from a transmitter to a receiver, and the value of a wireless telecommunications system is substantially dependent on how well the system mitigates the effects of those impairments. In some cases, the transmitter can take preventative measures, and in some cases the receiver can take remedial measures.

SUMMARY OF THE INVENTION

The present invention is a wireless telecommunications system that avoids some of the costs and disadvantages associated with wireless telecommunications systems in the prior art. For example, the illustrative embodiments of the present invention use a modulated radio-frequency carrier signal to convey data items wirelessly through a radio-frequency environment that comprises natural and man-made radio-frequency carrier signal-path impairments (e.g., objects, etc.) that reflect, refract, diffract, and absorb the modulated radio-frequency carrier signal.

A consequence of the presence of the signal-path impairments is that the radio receiver receives both direct-path and multipath images of the signal, which can cause infra-symbol and inter-symbol interference. The illustrative embodiments of the present invention are able to discriminate between direct-path and multipath images, which (substantially) prevents infra-symbol interference and enables the remediation of inter-symbol interference. Furthermore, the illustrative embodiments are also particularly effective remediating the effects of Doppler-shift impairments in the radio channel.

The illustrative embodiment of the present invention modulates the radio-frequency carrier signal with waveforms that are constructed to (substantially) prevent infra-symbol interference and enable the remediation of inter-symbol interference and Doppler-shift impairments.

As described in detail below, the nature of the waveforms is such that temporally-longer waveforms are better at preventing infra-symbol interference but introduce greater latency to the communications. Therefore, temporally-longer waveforms are less suitable for data items that are less latency tolerant (e.g., bi-directional voice communications, etc.) but more acceptable for data items that are high latency tolerant (e.g., broadcast uni-directional television, etc.). Temporally-longer waveforms are also advantageous as pilot signals and to discover the precise nature of the signal-path impairments.

In contrast, temporally-shorter waveforms are less effective in preventing infra-symbol interference but are more suitable for low latency tolerant data items. The illustrative embodiments of the present invention enables temporally-longer waveforms and temporally-shorter waveforms to be used concurrently in the same communications channel. This is advantageous for several reasons, including but not limited to, the ability of the telecommunications system to adapt on-the-fly the mix of longer and shorter waveforms based on the latency tolerance of the data items queued for transmission.

Furthermore, embodiments of the present invention enable a plurality of transmitters to simultaneously transmit (radiate) into the same radio channel to a single receiver in such a way that the receiver can separate the individual transmissions and properly associate them with their respective transmitters. This is widely called "multiple access" and is well known in other telecommunications systems (e.g., frequency-division multiple access, time-division multiple access, code-division multiple-access, etc.).

BRIEF DESCRIPTION OF THE DRAWINGS

FIG. 4c depicts a plot of where the energy associated with waveform φ2(1,1) of waveform array Φ2 (M2=6, N2=8) beginning at superframe time interval 1 is deposited into a 10 MHz radio channel.

FIG. 5d depicts a plot of where the energy associated with all of the waveforms from waveform arrays Φ1 assigned to base station 130-2 is deposited beginning at superframe time interval 1.

DETAILED DESCRIPTION

Figure 1A:
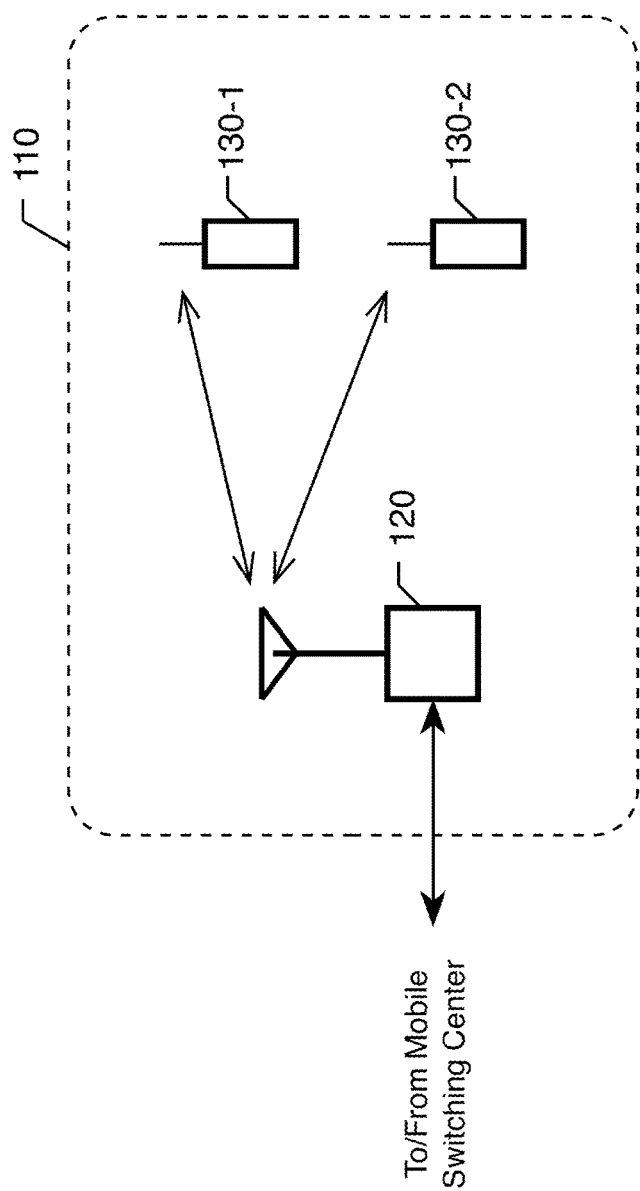
FIG. 1A depicts a block diagram of the salient components of wireless telecommunications system 100 in accordance with the illustrative embodiment of the present invention.

FIG. 1A depicts a block diagram of the salient components of wireless telecommunications system 100 in accordance with the illustrative embodiment of the present invention. Wireless telecommunications system 100 comprises: base station 120, wireless terminal 130-1, and wireless terminal 130-2, all of which are situated in geographic region 110.

In accordance with the illustrative embodiment, base station 120 provides bi-directional wireless telecommunications service to wireless terminal 130-1 and wireless terminal 130-2.

In accordance with the illustrative embodiment, base station 120 provides telecommunications service by exchanging "data items" with wireless terminal 130-1 and wireless terminal 130-2, which data items represent sound, images, video, data, and signaling. It will be clear to those skilled in the art how to make and use base station 120, wireless terminal 130, and wireless terminal 130-2 so that they can de-construct sound, images, video, data, and signaling into data items, and it will be clear to those skilled in the art how to make and use base station 120, wireless terminal 130, and wireless terminal 130-2 so that they can re-construct sound, images, video, data, and signaling from those data items.

In accordance with the illustrative embodiment, each data item is represented by a complex number that corresponds to one symbol in a 16 quadrature-amplitude ("16 QAM") signal constellation modulation scheme. It will be clear to those skilled in the art, however, after reading this disclosure, how to make and use alternative embodiments of the present invention in which each data item corresponds to a symbol in any digital modulation scheme (e.g., frequency-shift keying, amplitude-shift keying, phase-shift keying, etc.).

In accordance with the illustrative embodiment, wireless telecommunications system 100 comprises one base station and two wireless terminals, but it will be clear to those skilled in the art, after reading this disclosure, how to make and use alternative embodiments of the present invention that comprise any number of base stations and any number of wireless terminals. Furthermore, it will be clear to those skilled in the art how to partition the radio spectrum in an area into radio channels and to assign those channels to the base stations.

In accordance with the illustrative embodiment, base station 120 is stationary and terrestrial, but it will be clear to those skilled in the art, after reading this disclosure, how to make and use alternative embodiments of the present invention in which each base station 120 is mobile or airborne, or mobile and airborne.

In accordance with the illustrative embodiment, wireless terminal 130-1 and wireless terminal 130-2 are mobile, but it will be clear to those skilled in the art, after reading this disclosure, how to make and use alternative embodiments of the present invention in which each wireless terminal is either mobile or stationary.

In accordance with the illustrative embodiment, geographic region 110 comprises natural and man-made radio-frequency objects (not shown) that reflect, refract, and diffract the carrier signals that propagate between base station 120 and wireless terminal 130-1 and wireless terminal 130-2. Furthermore, some of the radio-frequency objects are stationary (e.g., trees, hills, buildings, etc.) and some are mobile (e.g., trucks, ships, airplanes, etc.).

In accordance with the illustrative embodiment, the parameters that characterize the signal-path impairments in the radio channel between base station 120 and wireless terminal 130-1 and wireless terminal 130-2 are dynamic (i.e., change with respect to time). It will be clear to those skilled in the art, after reading this disclosure, how to make and use embodiments of the present invention in which the characteristics of the radio channel and the nature of the signal-path impairments are static (i.e., do not change with respect to time).

In accordance with the illustrative embodiment, base station 120 and wireless terminal 130-1 and wireless terminal 130-2 exchange modulated radio-frequency carrier signals in a radio channel that is B=10 MHz wide. It will be clear to those skilled in the art, however, after reading this disclosure, how to make and use alternative embodiments of the present invention in which the radio channel has a different bandwidth (e.g., 2.5 MHz, 5.0 MHz, 12.5 MHz, 15 MHz, 20 MHz, 40 MHz, 80 MHz, etc.).

Figure 1B:
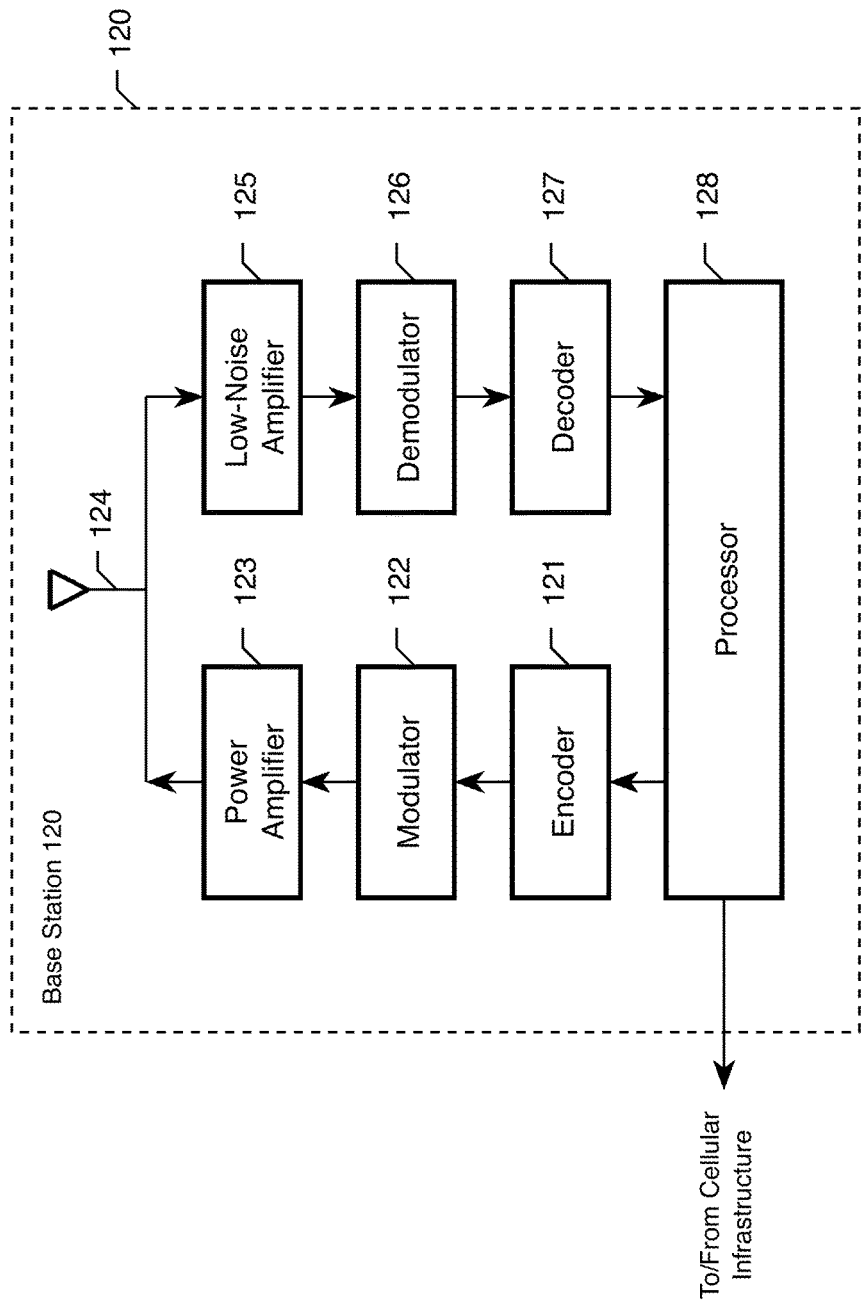
FIG. 1B depicts a block diagram of the salient components of base station 120 in accordance with the illustrative embodiment of the present invention.

FIG. 1B depicts a block diagram of the salient components of base station 120 in accordance with the illustrative embodiment of the present invention. Base station 120 comprises: encoder 121, modulator 122, power amplifier 123, and antenna 124, low-noise amplifier 125, demodulator 126, decoder 127, and processor 128.

Encoder 121 comprises the hardware and software necessary to compress, encrypt, and add forward error correction to the data items to be transmitted to wireless terminal 130-1 and wireless terminal 130-2. It will be clear to those skilled in the art how to make and use encoder 121.

Modulator 122 comprises the hardware and software necessary to modulate a radio-frequency carrier signal with the data items from encoder 121 to generate a modulated radio-frequency carrier signal. The construction and operation of modulator 122 is described in detail herein and in the accompanying figures.

Power amplifier 123 comprises the hardware necessary to increase the power of the modulated radio-frequency carrier signal for transmission via antenna 124. It will be clear to those skilled in the art how to make and use power amplifier 123.

Antenna 124 comprises the hardware necessary to facilitate the radiation of the modulated radio-frequency carrier signal wirelessly through space to wireless terminal 130-1 and wireless terminal 130-2. It will be clear to those skilled in the art how to make and use antenna 124.

Low-Noise amplifier 125 comprises the hardware necessary to increase the power of the modulated radio-frequency carrier signal received via antenna 124. It will be clear to those skilled in the art how to make and use low-noise amplifier 125.

Demodulator 126 comprises the hardware and software necessary to:
  i. demodulate the modulated radio-frequency carrier signal received by antenna 124, which is the sum of a first modulated radio-frequency carrier signal transmitted by wireless terminal 130-1 and a second modulated radio-frequency carrier signal transmitted by wireless terminal 130-2, and
  ii. recover one or more data items transmitted by wireless terminal 130-1 that are embodied in the modulated radio-frequency carrier signal and to associate those data items with wireless terminal 130-1, and
  iii. recover one or more data items transmitted by wireless terminal 130-2 that are embodied in the modulated radio-frequency carrier signal and to associate those data items with wireless terminal 130-2.

It will be clear to those skilled in the art, after reading this disclosure, how to make and use demodulator 126.

Decoder 127 comprises the hardware and software necessary to decompress, decrypt, and correct the data items transmitted by wireless terminal 130-1 and wireless terminal 130-2. It will be clear to those skilled in the art how to make and use decoder 127.

Processor 128 comprises the hardware and software necessary to operate base station 120 and to interface with the cellular infrastructure (not shown in FIG. 1B). It will be clear to those skilled in the art, after reading this disclosure, how to make and use processor 128.

Figure 1C:
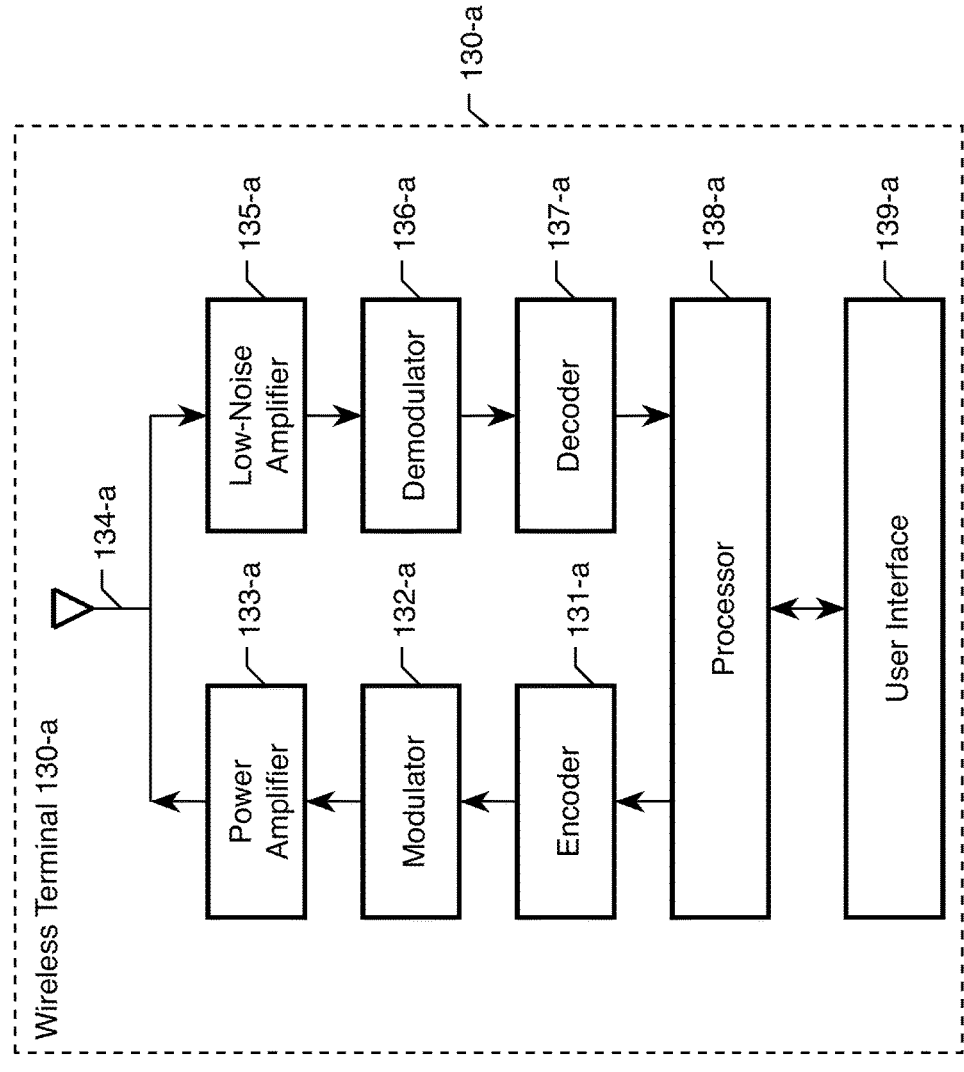
FIG. 1C depicts a block diagram of the salient components of wireless terminal 130-a, wherein a∈{1, 2}, in accordance with the illustrative embodiment of the present invention.

FIG. 1C depicts a block diagram of the salient components of wireless terminal 130-a, wherein a∈{1, 2}, in accordance with the illustrative embodiment of the present invention. Wireless terminal 130-a comprises: encoder 131-a, modulator 132-a, power amplifier 133-a, and antenna 134-a, low-noise amplifier 135-a, demodulator 136-a, decoder 137-a, processor 138-a, and user interface 139-a.

Encoder 131-a comprises the hardware and software necessary to compress, encrypt, and add forward error correction to the data items to be transmitted to base station 120. It will be clear to those skilled in the art how to make and use encoder 131-a.

Modulator 132-a comprises the hardware and software necessary to modulate a radio-frequency carrier signal with the data items from encoder 131-a to generate a modulated radio-frequency carrier signal. The construction and operation of modulator 132-a is described in detail herein and in the accompanying figures.

Power amplifier 133-a comprises the hardware necessary to increase the power of the modulated radio-frequency carrier signal for transmission via antenna 134-a. It will be clear to those skilled in the art how to make and use power amplifier 133-a.

Antenna 134-a comprises the hardware necessary to facilitate the radiation of the modulated radio-frequency carrier signal wirelessly through space to base station 120. It will be clear to those skilled in the art how to make and use antenna 134-a.

Low-Noise amplifier 135-a comprises the hardware necessary to increase the power of the modulated radio-frequency carrier signals received via antenna 134-a. It will be clear to those skilled in the art how to make and use low-noise amplifier 135-a.

Demodulator 136-a comprises the hardware and software necessary to demodulate a modulated radio-frequency carrier signal transmitted by base station 120 to recover the data items transmitted by base station 120. It will be clear to those skilled in the art, after reading this disclosure, how to make and use demodulator 136-a.

Decoder 137-a comprises the hardware and software necessary to decompress, decrypt, and correct the data items transmitted by base station 120. It will be clear to those skilled in the art how to make and use decoder 137-a.

Processor 138-a comprises the hardware and software necessary to operate wireless terminal 130-a and to interface with user interface 139-a. It will be clear to those skilled in the art, after reading this disclosure, how to make and use processor 138-a.

User interface 139-a comprises the hardware and software necessary to enable a user (not shown) to interact with wireless terminal 130-a. It will be clear to those skilled in the art how to make and use user interface 139-a.

Figure 2A:
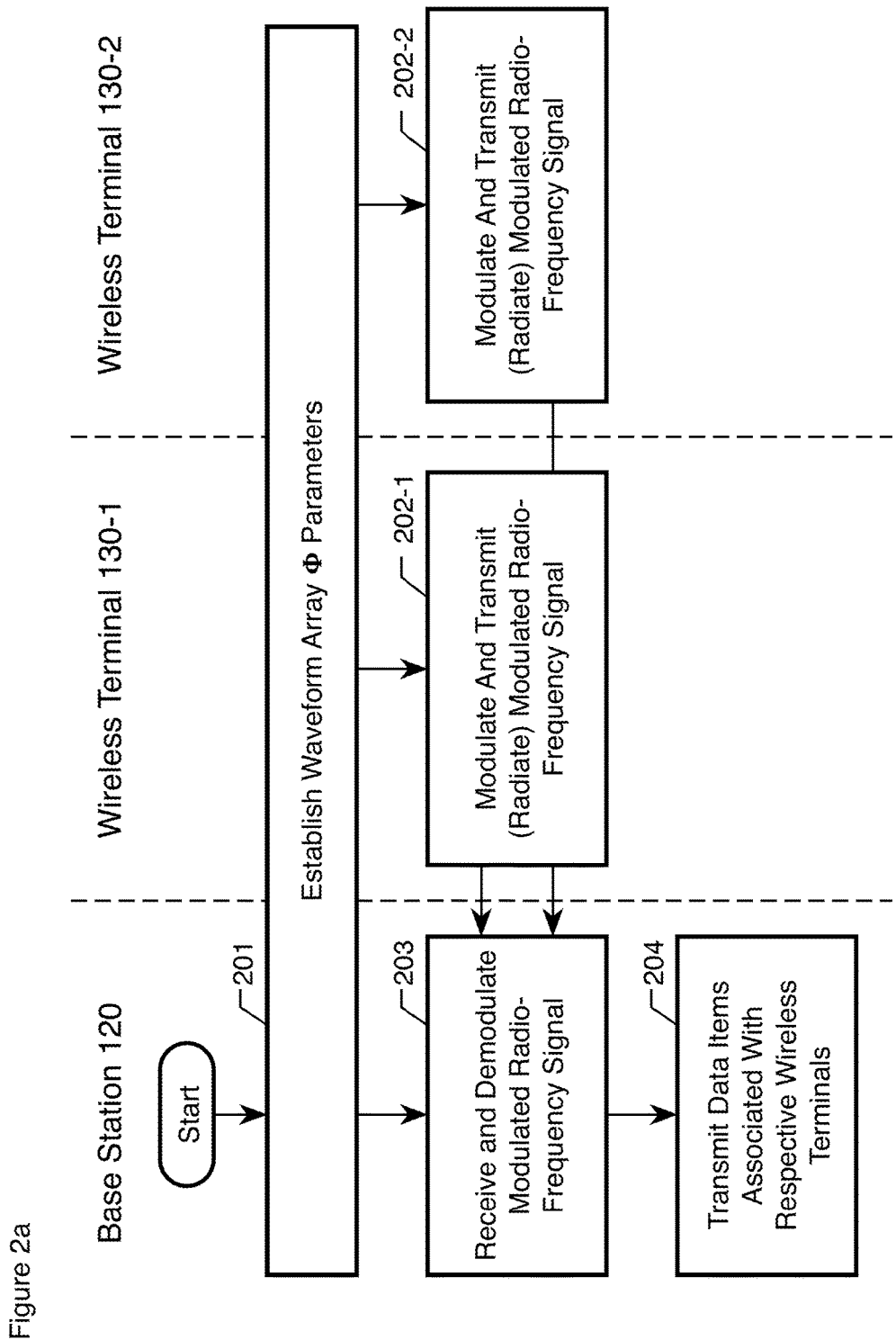
FIG. 2a depicts a flowchart of the salient tasks performed by base station 120, wireless terminal 130-1, and wireless terminal 130-2 in accordance with the illustrative embodiment of the present invention.

FIG. 2a depicts a flowchart of the salient tasks performed by base station 120, wireless terminal 130-1, and wireless terminal 130-2 in accordance with the illustrative embodiment of the present invention.

At task 201, base station 120, wireless terminal 130-1, and wireless terminal 130-2 establish the parameters of two non-identical waveform arrays waveform arrays $\Phi 1$ and $\Phi 2$—with which they will communicate. In accordance with the illustrative embodiment, base station 120, wireless terminal 130-1, and wireless terminal 130-2 establish the parameters of two non-identical waveforms arrays but it will be clear to those skilled in the art, after reading this disclosure, how to make and use alternative embodiments of the present invention that establish the parameters of any number (e.g., three, four, six, eight, twelve, sixteen, thirty-two, sixty-four, etc.) of non-identical waveform arrays. Task 201 is described in detail below and in the accompanying figures.

At task 202, wireless terminal 130-1 and wireless terminal 130-2 each transmit (radiate) a modulated radio-frequency carrier signal in a radio channel to base station 120 in accordance with the parameters of waveform arrays $\Phi 1$ and $\Phi 2$. Task 202 is described in detail below and in the accompanying figures.

At task 203, base station 120 receives a radio-frequency signal from the radio channel that is a sum of:
  1. the modulated radio-frequency carrier signal radiated by wireless terminal 130-1, plus
  2. the multipath images (if any) of the modulated radio-frequency carrier signal radiated by wireless terminal 130-1, plus
  3. the modulated radio-frequency carrier signal radiated by wireless terminal 130-2, plus 4. the multipath images (if any) of the modulated radio-frequency carrier signal radiated by wireless terminal 130-2, plus
5. noise.

As part of task 203, base station 120 demodulates and decodes the radio-frequency signal to recover one or more data items transmitted by wireless terminal 130-1 (and to associate those data items with wireless terminal 130-1) and one or more data items transmitted by wireless terminal 130-2 (and to associate those data items with wireless terminal 130-2). It will be clear to those skilled in the art, after reading this disclosure, how to make and use base station 120 to be able to perform task 230.

At task 204, base station 120 transmits one or more data items associated with wireless terminal 130-1 and one or more data items associated with wireless terminal 130-2 to the cellular infrastructure (e.g., a mobile switching center, etc.), which is not shown in FIG. 1B.

Figure 2B:
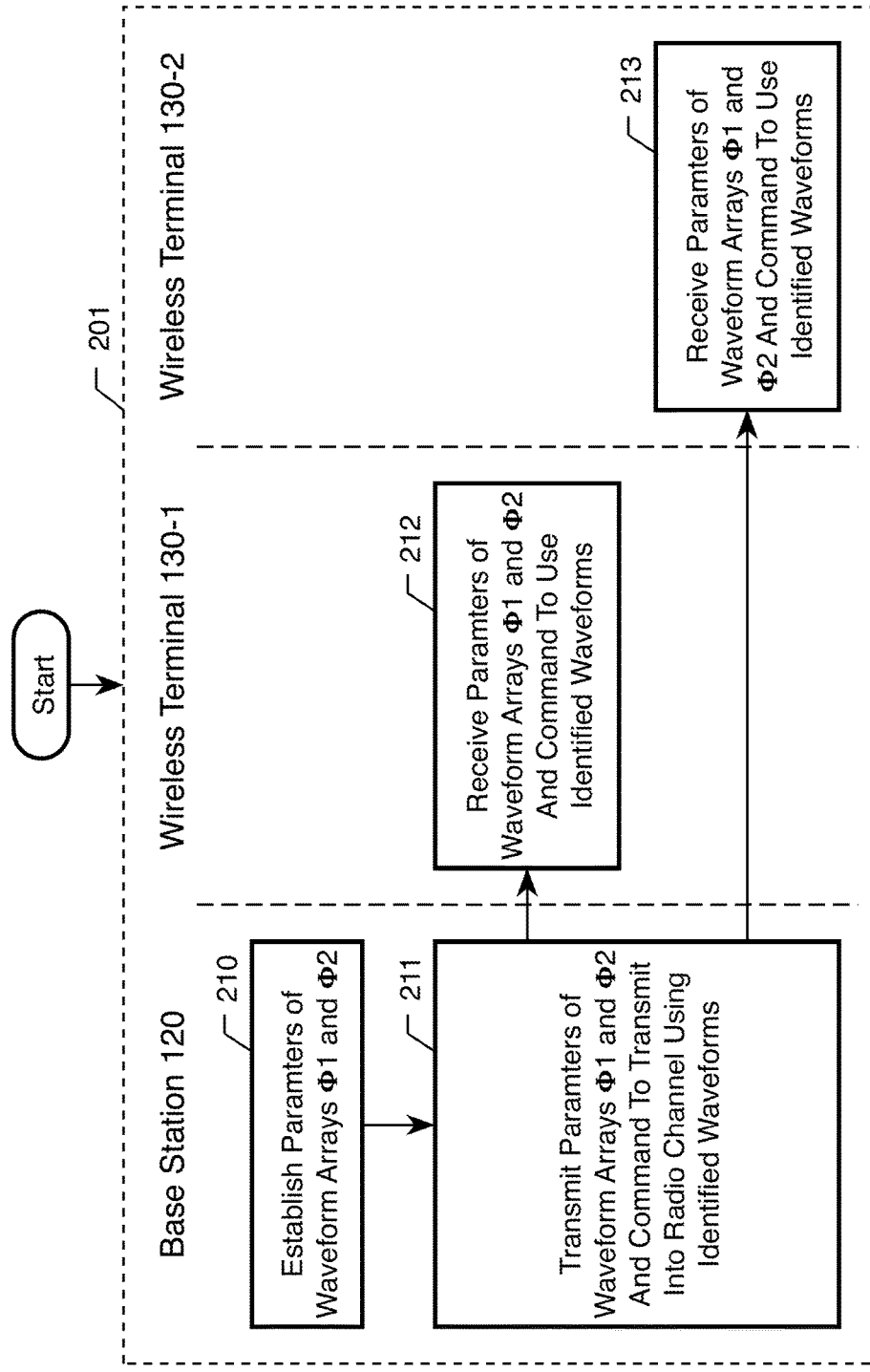
FIG. 2b depicts a flowchart of the salient tasks performed by base station 120, wireless terminal 130-1, and wireless terminal 130-2 in the performance of task 201.

FIG. 2b depicts a flowchart of the salient tasks performed by base station 120, wireless terminal 130-1, and wireless terminal 130-2 in the performance of task 201. As part of task 120, the parameters of waveform arrays $\Phi 1$ and $\Phi 2$ are chosen to:

i. mitigate infra-symbol interference caused by Doppler-shift and multipath interference in the radio channel, and
ii. enable simultaneous multiple access by both wireless terminal 130-1 and wireless terminal 130-2 to base station 120, and
iii. enable wireless terminal 130-1 to transmit waveforms of waveform arrays $\Phi 1$ and $\Phi 2$ into the radio channel at the same time (i.e., concurrently) while wireless terminal 130-2 transmits different waveforms of waveform arrays $\Phi 1$ and $\Phi 2$ into the same radio channel.

At task 210, and as is described in detail below, each waveform array $\Phi j$ is characterized by two parameters $Mj$ and $Nj$, wherein $Mj$ and $Nj$ are a positive integers greater than one and $j \in \{1, 2\}$ (i.e., waveform array $\Phi 1$ is characterized by parameters M1 and N1 and waveform array $\Phi 2$ is characterized by parameters M2 and N2).

In accordance with the first illustrative embodiment, M1=M2=6, N1=4, and N2=8 (i.e., M1=M2 and N1≠N2). In accordance with the second illustrative embodiment, M1=16, M2=32, N1=32, and N2=8 (i.e., M1≠M2 and N1=N2). In accordance with the third illustrative embodiment, M1=16, M2=32, N1=32, and N2=8 (i.e., M1≠M2 and N1≠N2). In all three illustrative embodiments, M1·N1≠M2·N2.

It will be clear to those skilled in the art, after reading this disclosure, how to make and use alternative embodiments of the present invention with any combination of values of M1, M2, N1, and N2. Furthermore, it will be clear to those skilled in the art, after reading this disclosure, that embodiments of the present invention are typically simplified and more efficient by making M2 an integral multiple of M1 (e.g., 2×, 3×, 4×, 5×, 6×, 8×, 12×, 16×, 32×, 64×, 128×, etc.). And still furthermore, it will be clear to those skilled in the art, after reading this disclosure, that embodiments of the present invention are typically simplified and more efficient by making N2 an integral multiple of N1 (e.g., 2×, 3×, 4×, 5×, 6×, 8×, 12×, 16×, 32×, 64×, 128×, etc.).

In accordance with the illustrative embodiment, the parameters of waveform arrays $\Phi 1$ and $\Phi 2$ are established once when base station 120, wireless terminal 130-1, and wireless terminal 130-2 first establish communication, but it will be clear to those skilled in the art, after reading this disclosure, how to make and use alternative embodiments of the present invention in which base station 120, wireless terminal 130-1, and wireless terminal 130-2 periodically or sporadically re-establish the parameters of waveform array $\Phi 1$ or waveform array $\Phi 2$ or waveform arrays $\Phi 1$ and $\Phi 2$. For example and without limitation, base station 120, wireless terminal 130-1, and wireless terminal 130-2 can re-establish the parameters of waveform arrays $\Phi 1$ and $\Phi 2$ when:

i. the traits of the signal path from change, or
ii. the type of data represented by the data items changes, or
iii. the latency tolerance of the data items changes, or
iv. any combination of i, ii, and iii.

As is described in detail below, waveform arrays $\Phi 1$ and $\Phi 2$ comprise waveforms that convey data items from wireless terminal 130-1 or wireless terminal 130-2 to base station 120. In accordance with the illustrative embodiment, wireless terminal 130-1 and wireless terminal 130-2 convey low-latency tolerant data items using waveform array $\Phi 1$ and high-latency tolerant data items using waveform array $\Phi 2$. It will be clear to those skilled in the art, after reading this disclosure, how to make and use alternative embodiments of the present invention in which wireless terminal 130-1 and wireless terminal 130-2 use the waveforms in different waveform arrays for:

i. different conditions of the signal path from wireless terminal 130-1 or wireless terminal 130-2 to base station 120, or
ii. different types of data items, or
iii. different latency tolerance of the data items, or
iv. any combination of i, ii, and iii.

Basic Waveforms—Waveform array $\Phi j$ is based on an extension of $Mj$ basic waveforms $bj(1), \ldots, bj(mj), \ldots, bj(Mj)$ that are orthogonal in $Mj$-dimensional vector space, where $Mj$ is a positive integer greater than 1, and $mj$ is a positive integer in the range $mj \in \{1, \ldots, Mj\}$.

Figure 3:
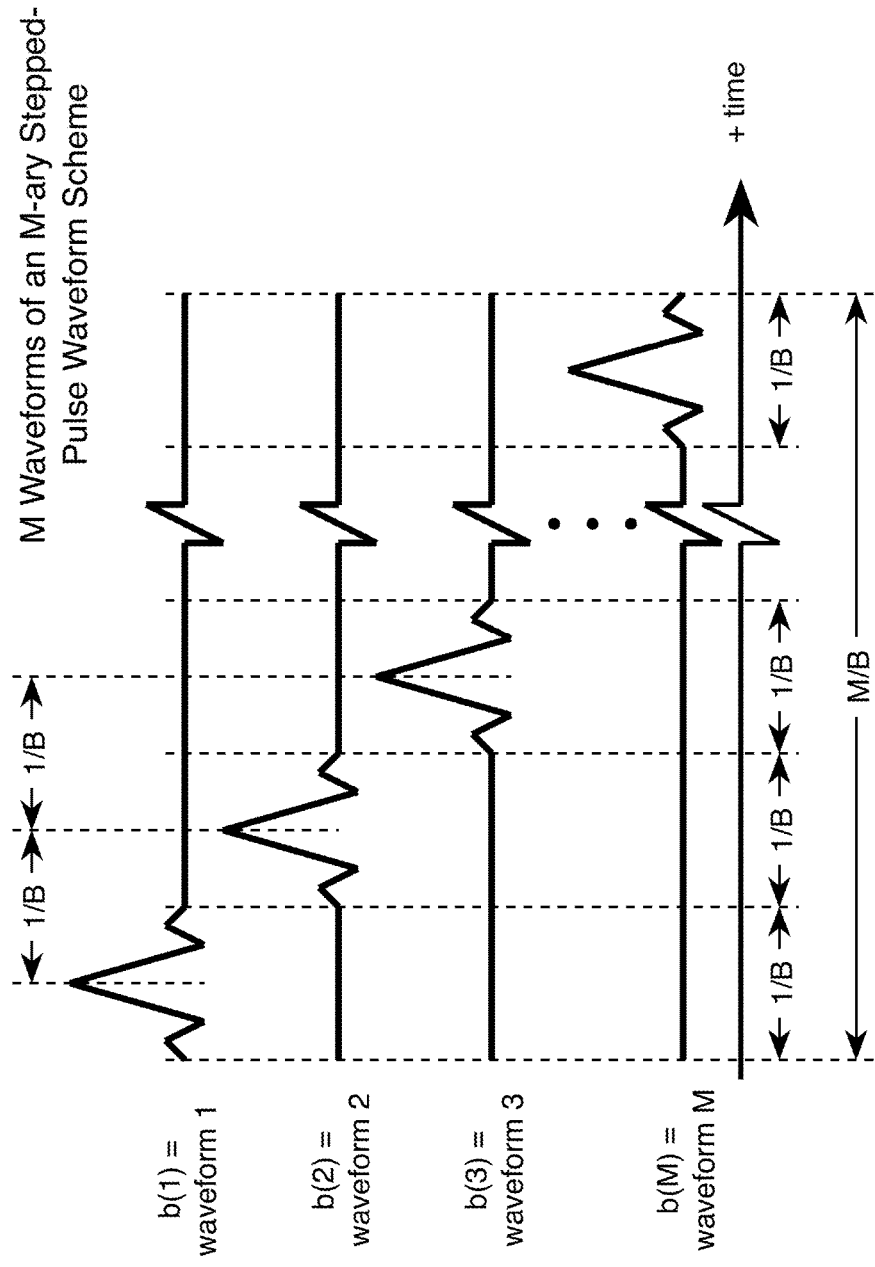
FIG. 3 depicts a waveform array $\Phi 1$ is based on M1 orthogonal M1-ary stepped-pulse waveforms.

In accordance with all of the illustrative embodiments, basic waveform $bj(mj)$ is waveform $mj$ of a $Mj$-ary stepped-pulse waveform scheme, as depicted in FIG. 3. In accordance with all of the illustrative embodiments, each pulse is a band-limited raised-cosine pulse but it will be clear to those skilled in the art, after reading this disclosure, how to make and use alternative embodiments of the present invention in which each pulse has a different shape.

Each pulse in basic waveform $bj(mj)$ is band-limited, and, therefore, the duration of each pulse is $1/B$ seconds, wherein B is the bandwidth of the channel. Furthermore, the centers of adjacent pulses are separated by $1/B$ seconds. And still furthermore, the total duration of each basic waveform $bj(mj)$ is $Mj/B$ seconds.

Although all of the illustrative embodiments uses stepped-pulse waveforms as the basic waveforms, it will be clear to those skilled in the art, however, after reading this disclosure, how to make and use alternative embodiments of the present invention in which waveform array $\Phi j$ is based on any set of $Mj$ orthogonal waveforms, $bj(1), \ldots, bj(Mj)$.

Structure of Waveform Array$\Phi$—Waveform array $\Phi j$ comprises $Mj \cdot Nj$ waveforms that are orthogonal in $Mj \cdot Nj$-dimensional vector space. The $Mj \cdot Nj$ waveforms of waveform array $\Phi j$ are denoted $\varphi j(1,1), \ldots, \varphi j(mj,nj), \ldots, \varphi j(Mj,Nj)$, where $nj$ is a positive integer in the range $nj \in \{1, \ldots, Nj\}$.

Each waveform $\varphi j(mj,nj)$ is the sum of $Nj$ waveforms $yj(mj,nj,1), \ldots, yj(mj,nj,pj), \ldots, yj(mj,nj,Nj)$.

Each waveform $\varphi j(mj,nj)$ is identically partitioned into $Nj$ time slots $1, \ldots, pj, \ldots, Nj$, where $pj$ is a positive integer in the range pj∈{1, . . . , Nj}. Waveform yj(mj,nj,pj) occupies time slot pj in waveform φj(trj,pj) and equals:

$$yj(mj,nj,pj)=bj(mj) \cdot u(nj,pj) \quad (Eq. 1)$$

wherein u(nj,pj) is a phasor that equals:

$$u(nj,pj)=\exp(2\pi(nj-1)(pj-1)i/Nj) \quad (Eq. 2)$$

The duration of waveform y(mj,nj,pj) defines the duration of time slot pj.

The Mj·Nj waveforms of waveform array Φj partition the time-frequency space of the modulated radio-frequency carrier signal into 1/B second-long "time intervals" and Mj·Nj "frequency sub-bands." Each waveform array Φj constitutes a "frame" of Mj·Nj time intervals, and the least common multiple of Mj·Nj for all j (e.g., the LCM(M1·N1, M2·N2) for j∈{1, 2}) constitutes a "superframe" of time intervals. The temporal start of each waveform is specified relative to the first time interval in the superframe.

A salient characteristic of the illustrative embodiment is that each waveform φj(mj,nj) in waveform array Φj deposits energy into:
  i. unique time-frequency portions the radio channel, and
  ii. 1/Mj·Nj$^{th}$ of the radio channel during the frame of waveform array Φj.

Figure 4A:
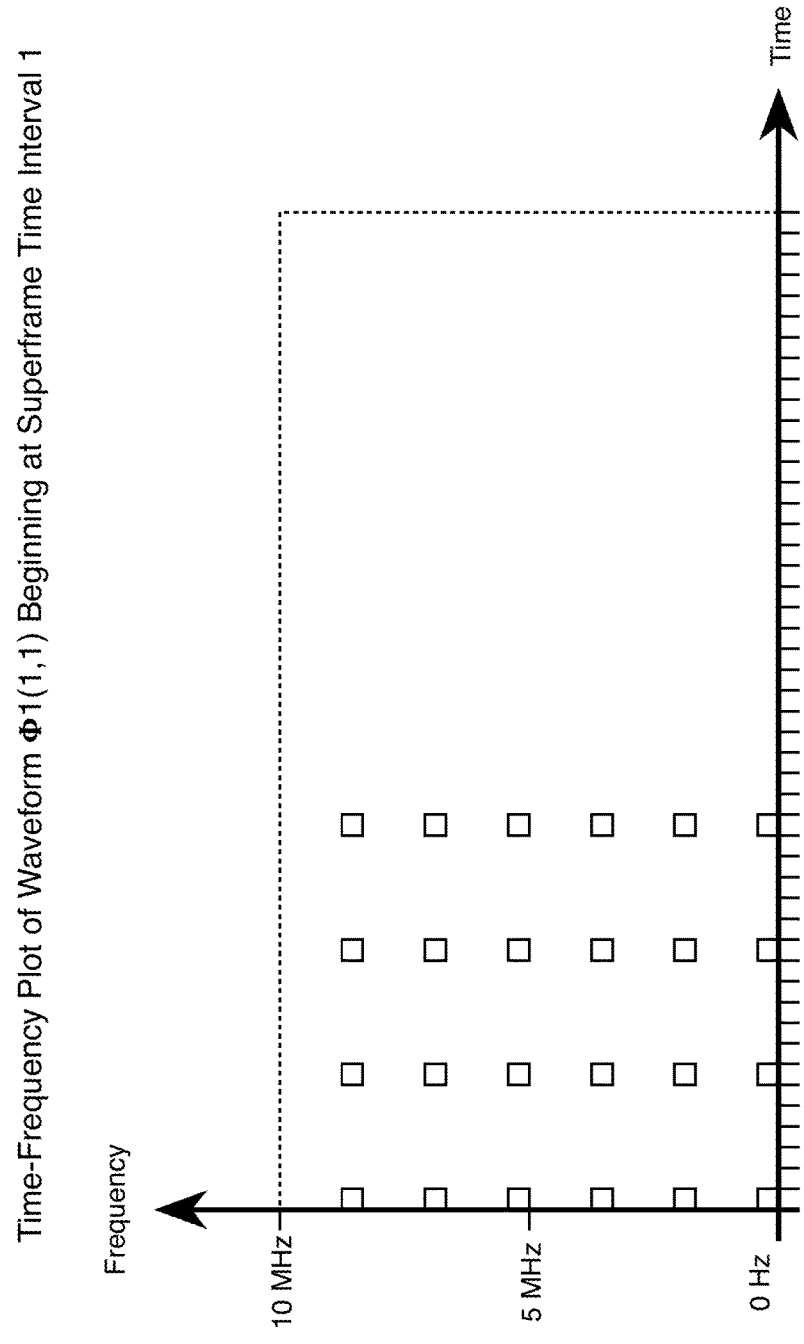
FIG. 4a depicts a plot of where the energy associated with waveform $\varphi 1(1,1)$ of waveform array $\Phi 1(M1=6, N1=4)$ beginning at superframe time interval 1 is deposited into a 10 MHz radio channel.
Figure 4B:
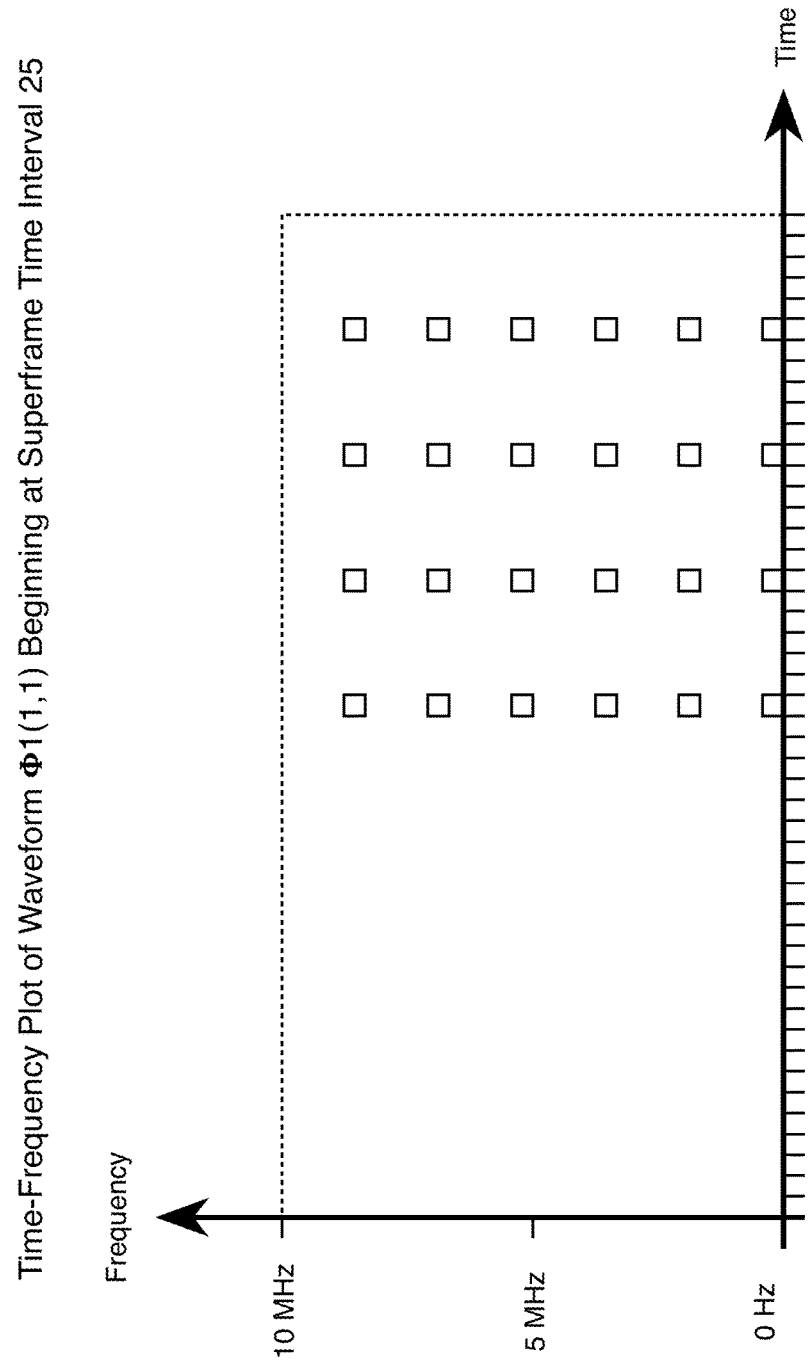
FIG. 4b depicts a plot of where the energy associated with waveform $\varphi 1(1,1)$ of waveform array $\Phi 1$ (M1=6, N1=4) beginning at superframe time interval 25 is deposited into a 10 MHz radio channel.

This is illustrated in FIGS. 4a, 4b, and 4c for waveform array Φ1 (M1=6, N1=4) and waveform array Φ2 (M2=6, N2=8).

For example, FIG. 4a depicts a plot of where the energy associated with waveform φ1(1,1) of waveform array Φ1 (M1=6, N1=4) beginning at superframe time interval 1 is deposited into a 10 MHz radio channel. In FIG. 4a the radio channel is depicted as divided into twenty-four (M1·N1=24) 416.66 KHz frequency sub-bands (B=10 MHz/M1·N1=24) and forty-eight [LCM(M1·N1, M2·N2)=24] 0.1 microsecond (1/B=10 MHz) time intervals. In FIG. 4a, it can be seen that energy is deposited only in time intervals 1, 7, 13, and 19 and only in the frequency sub-bands 0-0.416 MHz, 1.666-2.083 MHz, 3.333-3.750 MHz, 5.000-5.417 MHz, 6.666-7.083 MHz, and 8.333-8.750 MHz in the channel.

FIG. 4b depicts a plot of where the energy associated with waveform φ1(1,1) of waveform array Φ1 (M1=6, N1=4) beginning at superframe time interval 25 is deposited into a 10 MHz radio channel. In FIG. 4a the radio channel is depicted as divided into twenty-four (M1·N1=24) 416.66 KHz frequency sub-bands (B=10 MHz/M1·N1=24) and forty-eight [LCM(M1·N1, M2·N2)=24] 0.1 microsecond (1/B=10 MHz) time intervals. In FIG. 4b, it can be seen that energy is deposited only in time intervals 25, 31, 37, and 43 and only in the frequency sub-bands 0-0.416 MHz, 1.666-2.083 MHz, 3.333-3.750 MHz, 5.000-5.417 MHz, 6.666-7.083 MHz, and 8.333-8.750 MHz in the channel.

Similarly, FIG. 4c depicts a plot of where the energy associated with waveform φ2(1,1) of waveform array Φ2 (M2=6, N2=8) beginning at superframe time interval 1 is deposited into a 10 MHz radio channel. In FIG. 4a the radio channel is depicted as divided into twenty-four (M1·N1=24) 416.66 KHz frequency sub-bands (B=10 MHz/M1·N1=24) and forty-eight [LCM(M1·N1, M2·N2)=24] 0.1 microsecond (1/B=10 MHz) time intervals. In FIG. 4c, it can be seen that energy is deposited only in time intervals 1, 7, 13, 19, 25, 31, 37, and 43 and only in the frequency sub-bands 0-0.208 MHz, 1.666-1.875 MHz, 3.333-3.541 MHz, 5.000-5.208 MHz, 6.666-6.875 MHz, and 8.333-8.541 MHz in the channel.

It will be clear to those skilled in the art how to determine when and where any given waveform φj(mj,nj) will deposit energy into a radio channel using Fourier analysis in well-known fashion.

In accordance with the illustrative embodiment, base station 120 selects individual waveforms from waveform arrays Φ1 and Φ2 to convey data items from wireless terminal 130-1 and wireless terminal 130-2, and selects those waveforms so that:

I. no two waveforms overlap the time-frequency space of the modulated radio-frequency carrier signal (to prevent inter-symbol interference), and II. all of the time-frequency space of the modulated radio-frequency carrier signal has energy deposited into it (to maximize spectral efficiency), and III. waveforms from waveform array Φ1 convey data items with low-latency tolerance and waveforms from waveform array Φ2 convey data items with high-latency tolerance.

To accomplish this, base station 120 instructs wireless terminal 130-1 and wireless terminal 130-2 how to transmit waveforms from waveform array Φ1 and waveforms from waveform array Φ2 into the same channel at the same time with satisfactory guard waveforms (i.e., how to transmit waveforms from waveform array Φ1 and waveforms from waveform array Φ2 so that they:

1. overlap in the 4.8 microsecond superframe "time space" of the radio channel, and 2. overlap in the 10 MHz "frequency space" of the radio channel, and 3. do not overlap in the "time-frequency space" of the radio channel.

For example, FIGS. 5a, 5b, 5c, 5d, 5e, and 5f depict waveforms in which waveforms from waveform arrays Φ1(M1=6, N1=4) and Φ2(M2=6, N2=8) are either exclusively:

1. assigned to base station 130-1 to transmit data items to base station 120, or 2. assigned to base station 130-2 to transmit data items to base station 120, or 3. reserved as guard waveforms (and not transmitted by either base station 130-1 or base station 130-2.

Figure 5A:
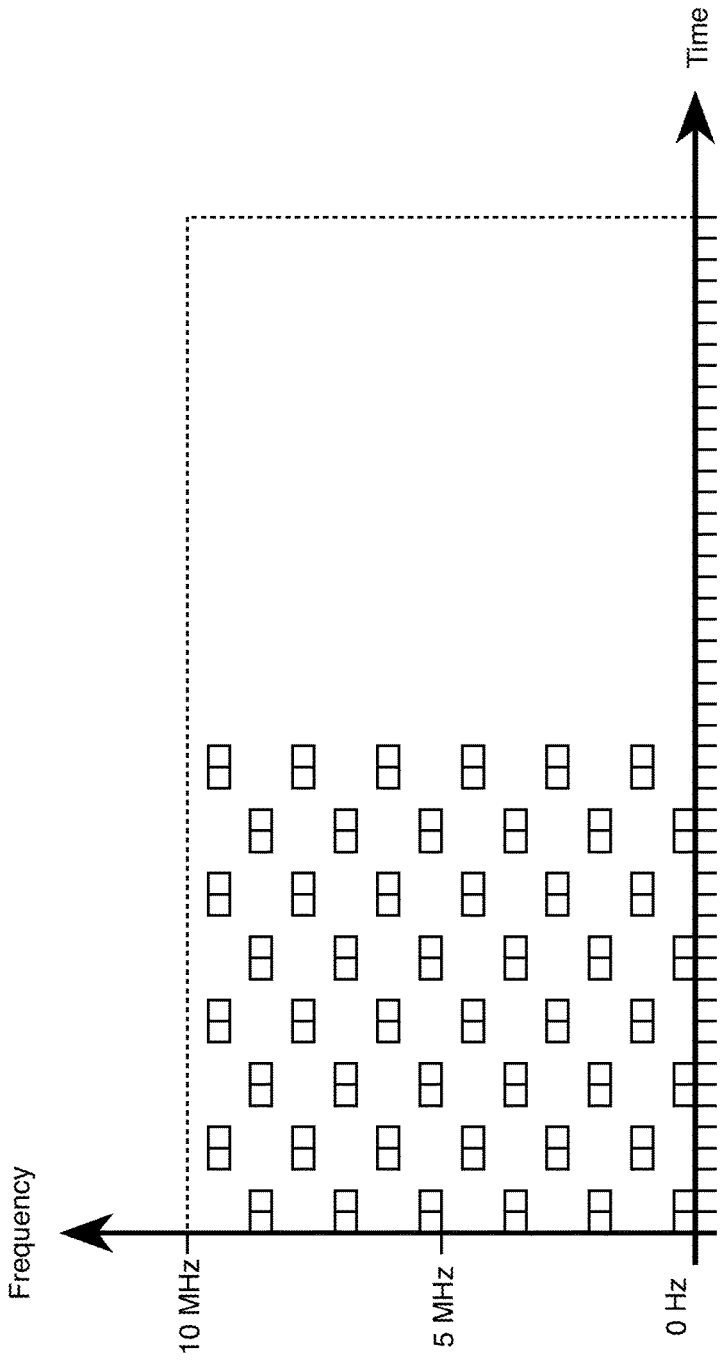
FIG. 5a depicts a plot of where the energy associated with all of the waveforms from waveform arrays Φ1 assigned to base station 130-1 is deposited beginning at superframe time interval 1.
Figure 5B:
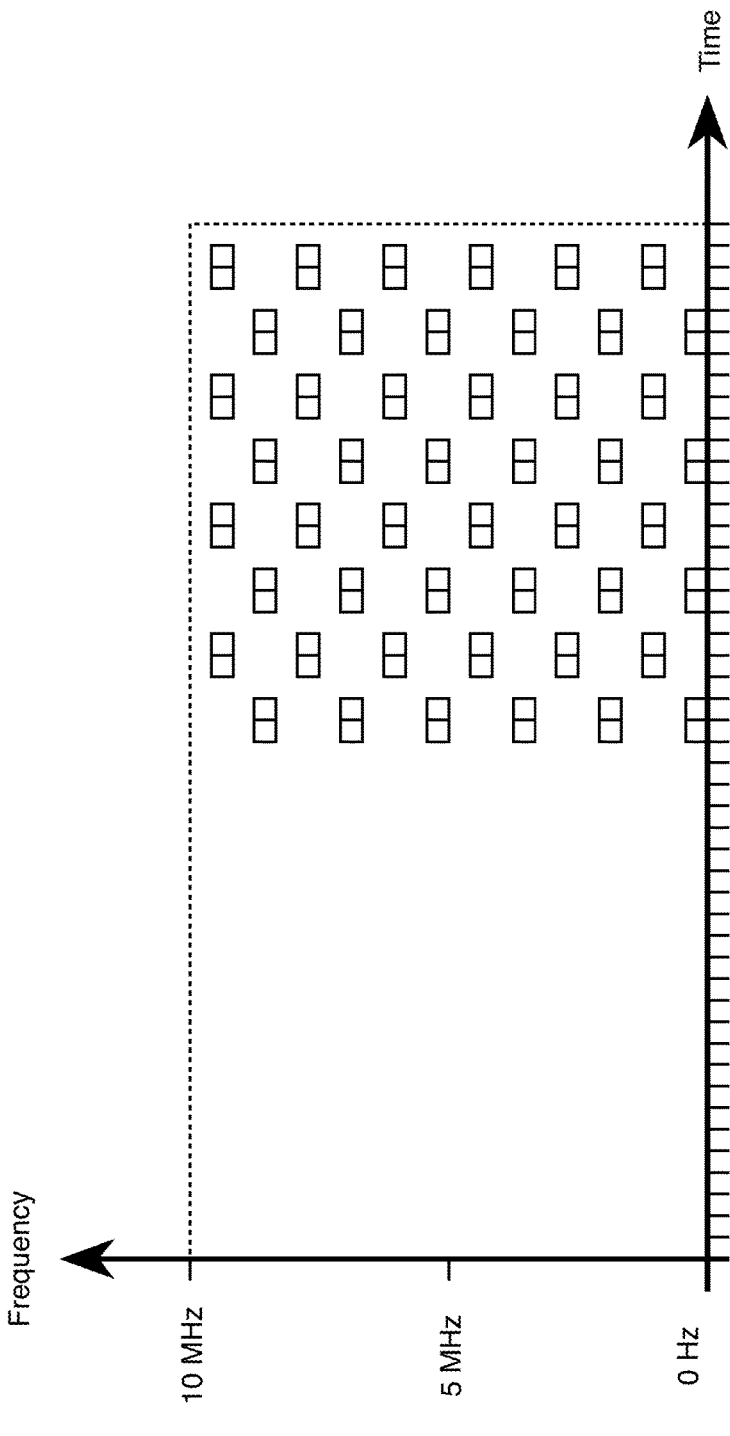
FIG. 5b depicts a plot of where the energy associated with all of the waveforms from waveform arrays Φ1 assigned to base station 130-1 is deposited beginning at superframe time interval 25.

Base station 130-1 is assigned four waveforms from waveform array Φ1 beginning at superframe time interval 1 and superframe time interval 25, as shown in Table 1 and as depicted in FIGS. 5a and 5b, respectively.

TABLE 1

Waveforms from Waveform Array Φ1
Assigned to Base Station 130-1

| Conveying Waveform | Beginning Superframe Time Interval |
|---|---|
| φ1(1, 1) | 1, 25 |
| φ1(1, 2) | 1, 25 |
| φ1(4, 3) | 1, 25 |
| φ1(5, 3) | 1, 25 |

Figure 5C:
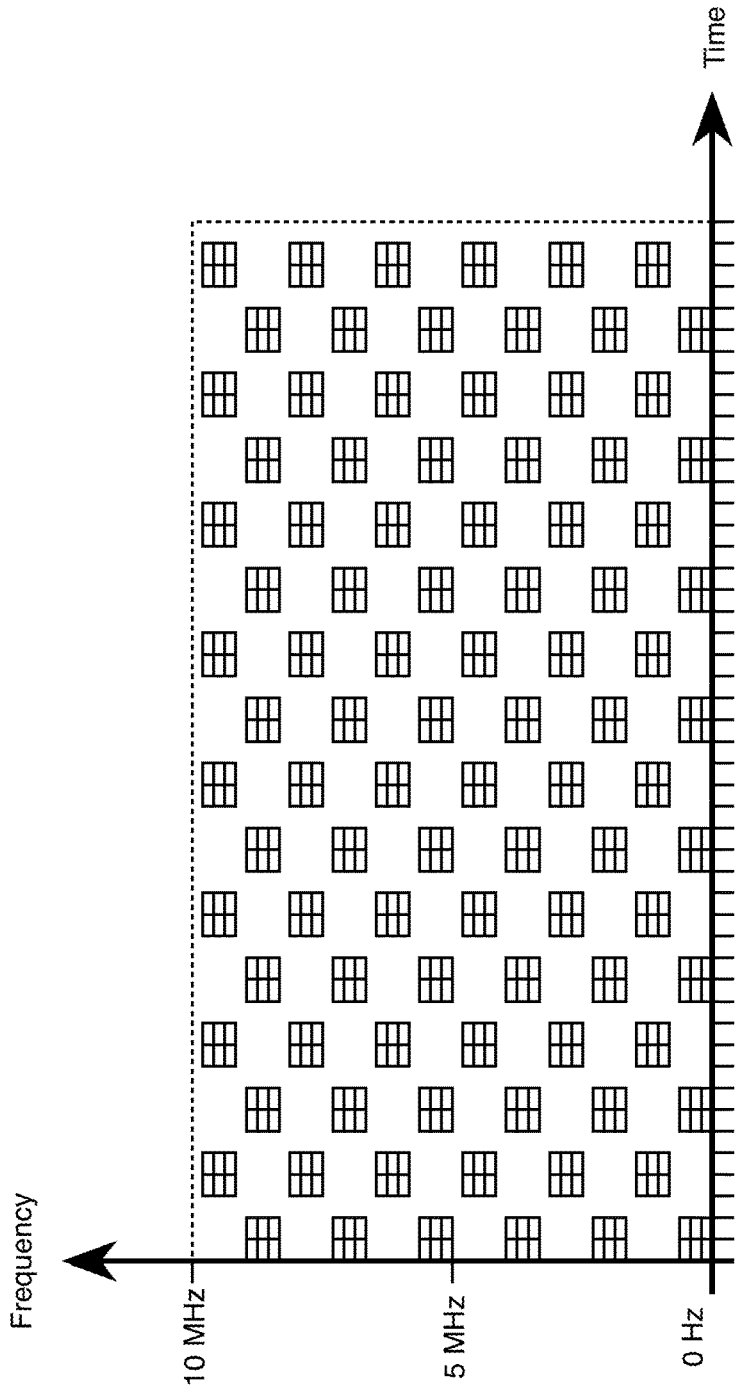
FIG. 5c depicts a plot of where the energy associated with all of the waveforms from waveform arrays Φ2 assigned to base station 130-1 is deposited beginning at superframe time interval 1.

Base station 130-1 is also assigned twelve waveforms from waveform array Φ2 beginning at superframe time interval 1, as shown in Table 2 and as depicted in FIG. 5c.

TABLE 2

Waveforms from Waveform Array Φ2
Assigned to Base Station 130-1

| Conveying Waveform | Beginning Superframe Time Interval |
|---|---|
| φ2(1, 1) | 1 |
| φ2(1, 2) | 1 |
| φ2(1, 3) | 1 |
| φ2(2, 1) | 1 |
| φ2(2, 3) | 1 |
| φ2(2, 4) | 1 |
| φ2(4, 5) | 1 |
| φ2(4, 6) | 1 |
| φ2(4, 7) | 1 |
| φ2(5, 5) | 1 |
| φ2(5, 6) | 1 |
| φ2(5, 7) | 1 |

It will be clear to those skilled in the art, after reading this disclosure, that base station 130-1 can transmit (in a single superframe) only those combinations of waveforms assigned to it that do not interfere with each other (i.e., do not put energy into the same "time-frequency space" of the radio channel). Furthermore, it will be clear to those skilled in the art, after reading this disclosure, which combinations of waveforms can be transmitted (in a single superframe) so as to not interfere with each other.

Figure 5E:
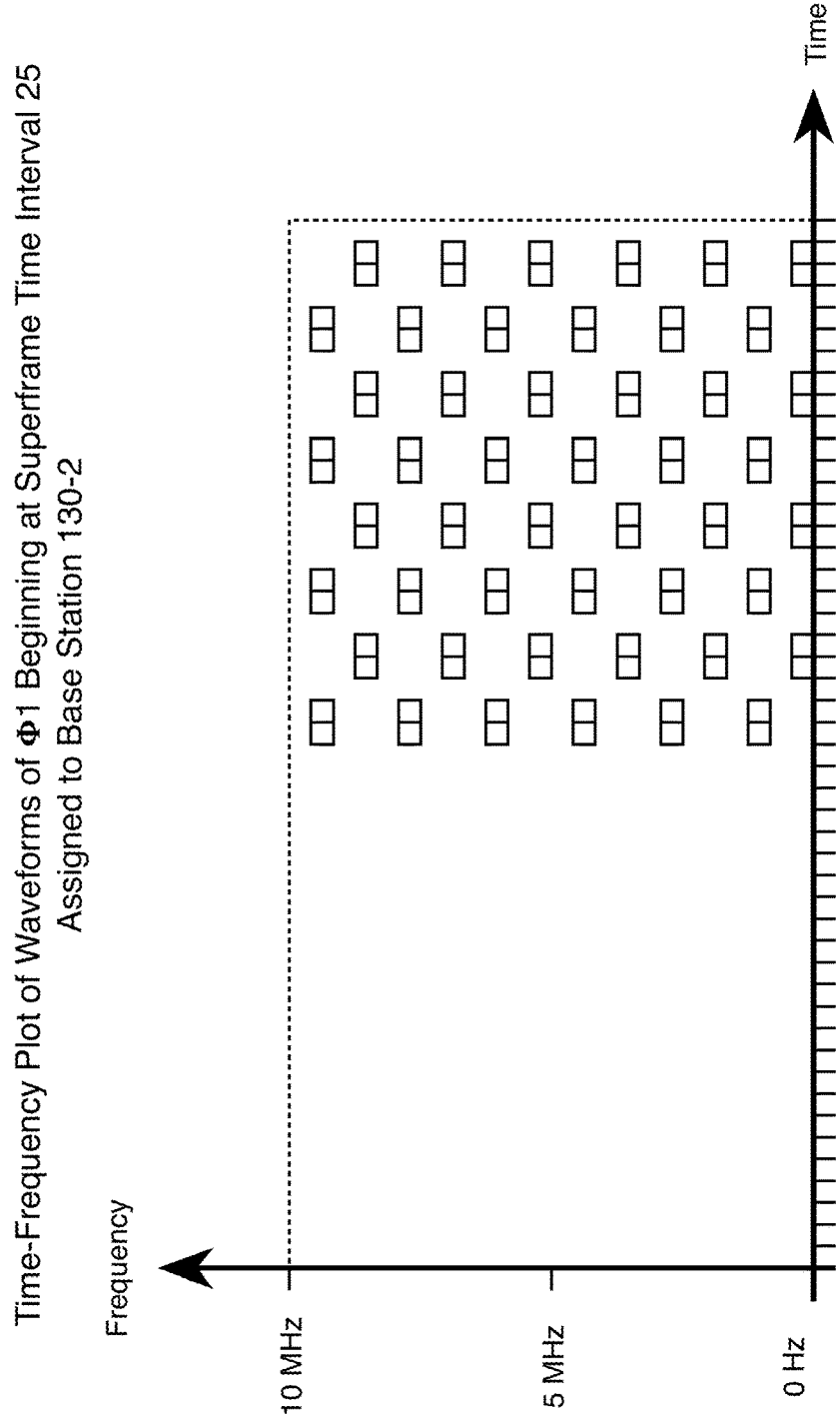
FIG. 5e depicts a plot of where the energy associated with all of the waveforms from waveform arrays Φ1 assigned to base station 130-2 is deposited beginning at superframe time interval 25.

Base station 130-2 is assigned four waveforms from waveform array 11 beginning at superframe time interval 1 and superframe time interval 25, as shown in Table 3 and as depicted in FIGS. 5*d* and 5*e*, respectively.

TABLE 3

Waveforms from Waveform Array Φ1
Assigned to Base Station 130-2

| Conveying Waveform | Beginning Superframe Time Interval |
|---|---|
| φ1(1, 3) | 1, 25 |
| φ1(2, 3) | 1, 25 |
| φ1(4, 1) | 1, 25 |
| φ1(5, 1) | 1, 25 |

Figure 5F:
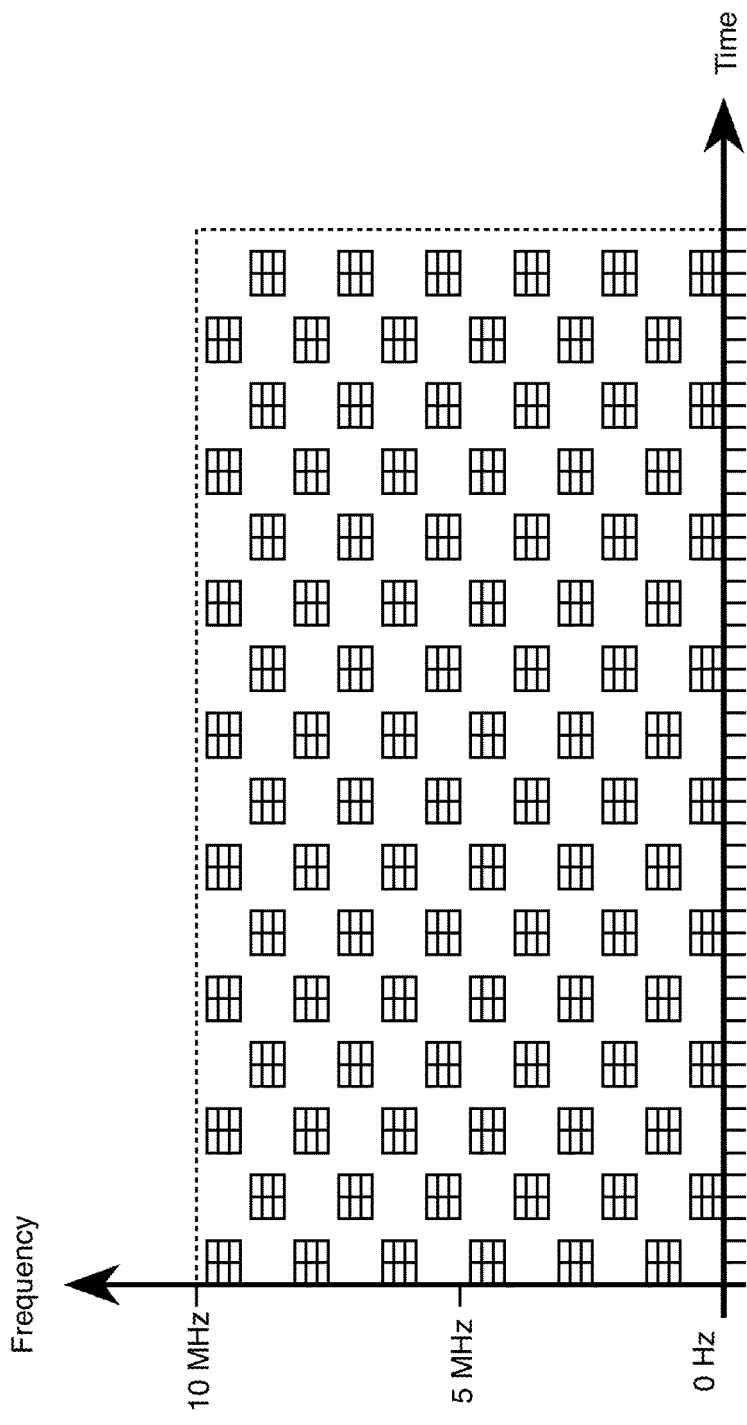
FIG. 5f depicts a plot of where the energy associated with all of the waveforms from waveform arrays Φ2 assigned to base station 130-2 is deposited beginning at superframe time interval 1.

Base station 130-2 is also assigned twelve waveforms from waveform array F2 beginning at superframe time interval 1, as shown in Table 4 and as depicted in FIG. 5*f*.

TABLE 4

Waveforms from Waveform Array Φ2
Assigned to Base Station 130-2

| Conveying Waveform | Beginning Superframe Time Interval |
|---|---|
| φ2(1, 5) | 1 |
| φ2(1, 6) | 1 |
| φ2(1, 7) | 1 |
| φ2(2, 5) | 1 |
| φ2(2, 6) | 1 |
| φ2(2, 7) | 1 |
| φ2(4, 1) | 1 |
| φ2(4, 2) | 1 |

TABLE 4-continued

Waveforms from Waveform Array Φ2
Assigned to Base Station 130-2

| Conveying Waveform | Beginning Superframe Time Interval |
|---|---|
| φ2(4, 3) | 1 |
| φ2(5, 1) | 1 |
| φ2(5, 2) | 1 |
| φ2(5, 3) | 1 |

It will be clear to those skilled in the art, after reading this disclosure, that base station 130-1 can transmit (in a single superframe) only those combinations of waveforms assigned to it that do not interfere with each other (i.e., do not put energy into the same "time-frequency space" of the radio channel). Furthermore, it will be clear to those skilled in the art, after reading this disclosure, which combinations of waveforms can be transmitted (in a single superframe) so as to not interfere with each other.

The remaining waveforms which were not assigned to either base station 130-1 or base station 130-2 are reserved as guard waveforms in order to reduce inter-symbol interference from multi-path images and Doppler shifts.

It will be clear to those skilled in the art, after reading this disclosure, how to make and use alternative embodiments of the present invention that assign any combination of waveforms for conveying data items and any combination of waveforms for use as guard waveforms. Furthermore, it will be clear to those skilled in the art, after reading this disclosure, how to partition the waveforms in waveform array t among any number of wireless terminals and guard waveforms.

At task 211, base station 120 transmits the waveform array Φ parameters to wireless terminal 130-1 and wireless terminal 130-2 along with a command to transmit into the radio channel using the assigned waveforms.

At task 212, wireless terminal 130-1 receives the waveform array Φ parameters and the command to use the waveforms assigned to it.

At task 213, wireless terminal 130-2 receives the waveform array Φ parameters and the command to use the waveforms assigned to it.

Figure 6:
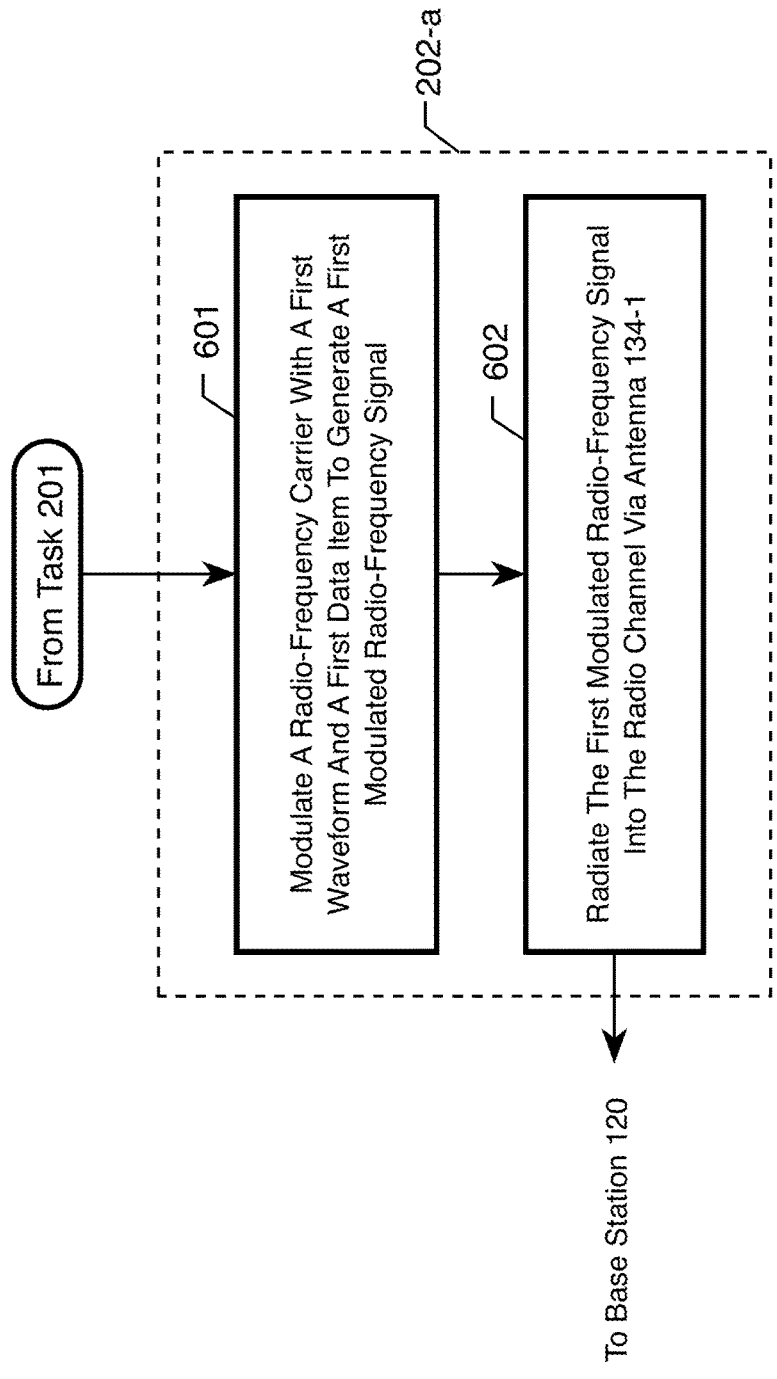
FIG. 6 depicts a flowchart of the salient tasks associated with task 202-a, wherein a∈{1, 2}, in accordance with the illustrative embodiment of the present invention.

FIG. 6 depicts a flowchart of the salient tasks associated with task 202-a, wherein a∈{1, 2}, in accordance with the illustrative embodiment of the present invention.

At task 1601, wireless terminal 130-a establishes a one-to-one relationship between each data item it will transmit to base station 120 and each waveform φ(m,n) in waveform array Φ that has been assigned to it. As part of task 1601, wireless terminal 130-a modulates a radio-frequency carrier signal with each waveform assigned to it and the corresponding data item to generate a modulated radio-frequency carrier signal. It will be clear to those skilled in the art, after reading this disclosure, how to make and use embodiments of the present invention that perform task 1601.

At task 1602, the modulated radio-frequency carrier signal is radiated into the radio channel via antenna 134-a for reception by base station 120. It will be clear to those skilled in the art, after reading this disclosure, how to make and use embodiments of the present invention that perform task 1602.

Markman Definitions

Orthogonal—For the purpose of this specification, two waveforms are orthogonal if their inner product is zero over the time interval of interest.

Identical Waveform Arrays—For the purposes of this specification, waveform array $\Phi1(M1, N1)$ and waveform array $\Phi2(M2, N2)$ are identical if $M1=M2$ and $N1=N2$.

Non-identical Waveform Arrays—For the purposes of this specification, waveform array $\Phi1(M1, N1)$ and waveform array $\Phi2(M2, N2)$ are non-identical if they are not identical.

What is claimed is:

1. A process comprising:
transmitting:
  (a) a first command to a first wireless terminal to transmit, into a radio channel during a superframe, a first modulated radio-frequency carrier signal that is modulated with:
    (i) a first waveform $\varphi1(m1,n1)$ of a first waveform array $\Phi1$ and a first data item, and
    (ii) a second waveform $\varphi2(m2,n2)$ of a second waveform array $\Phi2$ and a second data item, and
  (b) a second command to a second wireless terminal to transmit, into the radio channel during the superframe, a second modulated radio-frequency carrier signal that is modulated with:
    (i) a third waveform $\varphi1(m3,n3)$ of the first waveform array $\Phi1$ and a third data item, and
    (ii) a fourth waveform $\varphi2(m4,n4)$ of the second waveform array $\Phi2$ and a fourth data item, and
  wherein:
    (i) the waveform $\varphi1(m1,n1)$ is partitioned into N1 time slots, and
    (ii) the waveform $\varphi2(m2,n2)$ is partitioned into N2 time slot, and
    (iii) time slot p1 of the waveform $\varphi1(m1,n1)$ comprises a basic waveform $b1(m1)$ multiplied by $\exp[2\pi(n1-1)(p1-1)i/N1]$, and
    (iv) time slot p2 of the waveform $\varphi2(m2,n2)$ comprises a basic waveform $b2(m2)$ multiplied by $\exp[2\pi(n2-1)(p2-1)i/N2]$, and
    (v) time slot p3 of the waveform $\varphi1(m3,n3)$ comprises a basic waveform $b1(m3)$ multiplied by $\exp[2\pi(n3-1)(p3-1)i/N1]$, and
    (vi) time slot p4 of the waveform $\varphi2(m4,n4)$ comprises a basic waveform $b2(m4)$ multiplied by $\exp[2\pi(n4-1)(p4-1)i/N2]$, and
    (vii) the waveform $\varphi1(m1,n1)$ is multiplied by the first data item, and
    (viii) the waveform $\varphi2(m2,n2)$ is multiplied by the second data item, and
    (ix) the waveform $\varphi1(m3,n3)$ is multiplied by the third data item, and
    (x) the waveform $\varphi2(m4,n4)$ is multiplied by the fourth data item, and
    (xi) M1, N1, M2, and N2 are positive integers greater than 1, and
    (xii) m1 and m3 are positive integers in the range m1, m3$\in\{1, \ldots, M1\}$, and
    (xiii) m2 and m4 are positive integers in the range m2, m4$\in\{1, \ldots, M2\}$, and
    (xiv) n1, n3, p1, and p3 are positive integers in the range n1, n3, p1, and p3$\in\{1, \ldots, N1\}$, and
    (xv) n2, n4, p2, and p4 are positive integers in the range n2, n4, p2, and p4$\in\{1, \ldots, N2\}$, and
    (xvi) M1$\neq$M2;
receiving, from the radio channel during the frame, a third modulated radio-frequency carrier signal via an antenna;
demodulating the third modulated radio-frequency carrier signal to recover the first data item, the second data item, the third data item, and the fourth data item; and
transmitting the first data item and the second data item in association with the first wireless terminal and the third data item and the fourth data item in association with the second wireless terminal.

2. The process of claim 1 wherein M2 is an integral multiple of M1 and M1<M2.

3. The process of claim 1 wherein N1$\neq$N2.

4. The process of claim 1 wherein N2 is an integral multiple of N1 and N1<N2.

5. The process of claim 1 wherein waveform $\varphi1(m1,n1)$ and waveform $\varphi2(m2,n2)$ begin at superframe time interval 1.

6. The process of claim 1 wherein waveform $\varphi1(m1,n1)$ is frame unaligned with waveform $\varphi2(m2,n2)$ in the modulated radio-frequency carrier signal.

7. The process of claim 1 wherein the waveform $\varphi1(m1,n1)$ and the waveform $\varphi2(m2,n2)$ do not overlap in the time-frequency space of the modulated radio-frequency carrier signal.

8. The process of claim 1 wherein the bandwidth of the radio channel is B Hz, and the duration of the basic waveform $b1(m1)$ is M1/B seconds.

9. The process of claim 1 wherein the bandwidth of the radio channel is B Hz, wherein the duration of the waveform $\varphi1(m1,n1)$ is M1·N1/B seconds, and wherein the duration of the waveform $\varphi2(m2,n2)$ is M2·N2/B seconds.

10. The process of claim 1 wherein the first data item is less latency tolerant than the second data item.

11. A process comprising:
transmitting:
  (a) a first command to a first wireless terminal to transmit, into a radio channel during a superframe, a first modulated radio-frequency carrier signal that is modulated with:
    (i) a first waveform $\varphi1(m1,n1)$ of a first waveform array $\Phi1$ and a first data item, and
    (ii) a second waveform $\varphi2(m2,n2)$ of a second waveform array $\Phi2$ and a second data item, and
  (b) a second command to a second wireless terminal to transmit, into the radio channel during the superframe, a second modulated radio-frequency carrier signal that is modulated with:
    (i) a third waveform $\varphi1(m3,n3)$ of the first waveform array $\Phi1$ and a third data item, and
    (ii) a fourth waveform $\varphi2(m4,n4)$ of the second waveform array $\Phi2$ and a fourth data item, and
  wherein:
    (i) the waveform $\varphi1(m1,n1)$ is partitioned into N1 time slots, and
    (ii) the waveform $\varphi2(m2,n2)$ is partitioned into N2 time slot, and
    (iii) time slot p1 of the waveform $\varphi1(m1,n1)$ comprises a basic waveform $b1(m1)$ multiplied by $\exp[2\pi(n1-1)(p1-1)i/N1]$, and
    (iv) time slot p2 of the waveform $\varphi2(m2,n2)$ comprises a basic waveform $b2(m2)$ multiplied by $\exp[2\pi(n2-1)(p2-1)i/N2]$, and
    (v) time slot p3 of the waveform $\varphi1(m3,n3)$ comprises a basic waveform $b1(m3)$ multiplied by $\exp[2\pi(n3-1)(p3-1)i/N1]$, and
    (vi) time slot p4 of the waveform $\varphi2(m4,n4)$ comprises a basic waveform $b2(m4)$ multiplied by $\exp[2\pi(n4-1)(p4-1)i/N2]$, and
    (vii) the waveform $\varphi1(m1,n1)$ is multiplied by the first data item, and
    (viii) the waveform $\varphi2(m2,n2)$ is multiplied by the second data item, and (ix) the waveform φ1(m3,n3) is multiplied by the third data item, and (x) the waveform φ2(m4,n4) is multiplied by the fourth data item, and (xi) M1, N1, M2, and N2 are positive integers greater than 1, and (xii) m1 and m3 are positive integers in the range m1, m3∈{1, ..., M1}, and (xiii) m2 and m4 are positive integers in the range m2, m4∈{1, ..., M2}, and (xiv) n1, n3, p1, and p3 are positive integers in the range n1, n3, p1, and p3∈{1, ..., N1}, and (xv) n2, n4, p2, and p4 are positive integers in the range n2, n4, p2, and p4∈{1, ..., N2}, and (xvi) N1≠N2;

receiving, from the radio channel during the frame, a third modulated radio-frequency carrier signal via an antenna;

demodulating the third modulated radio-frequency carrier signal to recover the first data item, the second data item, the third data item, and the fourth data item; and transmitting the first data item and the second data item in association with the first wireless terminal and the third data item and the fourth data item in association with the second wireless terminal.

12. The process of claim 11 wherein M2 is an integral multiple of M1 and M1<M2.

13. The process of claim 11 wherein M1≠M2.

14. The process of claim 11 wherein N2 is an integral multiple of N1 and N1<N2.

15. The process of claim 11 wherein waveform φ1(m1,n1) and waveform φ2(m2,n2) begin at superframe time interval 1.

16. The process of claim 11 wherein waveform φ1(m1,n1) is frame unaligned with waveform φ2(m2,n2) in the modulated radio-frequency carrier signal.

17. The process of claim 11 wherein the waveform φ1(m1,n1) and the waveform φ2(m2,n2) do not overlap in the time-frequency space of the modulated radio-frequency carrier signal.

18. The process of claim 11 wherein the bandwidth of the radio channel is B Hz, and the duration of the basic waveform b1(m1) is M1/B seconds.

19. The process of claim 11 wherein the bandwidth of the radio channel is B Hz, wherein the duration of the waveform φ1(m1,n1) is M1·N1/B seconds, and wherein the duration of the waveform φ2(m2,n2) is M2·N2/B seconds.

20. The process of claim 11 wherein the first data item is less latency tolerant than the second data item.

* * * * *